United States Patent [19]

Levinson et al.

[11] Patent Number: 5,384,357
[45] Date of Patent: Jan. 24, 1995

[54] INFRARED RADIATION CURABLE ORGANOPOLYSILOXANE COMPOSITIONS

[75] Inventors: Lionel M. Levinson, Schenectady; William N. Schultz, Niskayuna; Larry N. Lewis; Chris A. Sumpter, both of Scotia; Michael A. Zumbrum, Clifton Park, all of N.Y.

[73] Assignee: General Electric Company, Schenectady, N.Y.

[21] Appl. No.: 970,498

[22] Filed: Nov. 2, 1992

[51] Int. Cl.⁶ .............................................. C08L 83/04
[52] U.S. Cl. .................................. 524/770; 524/780; 524/785; 524/791; 524/862
[58] Field of Search ............... 524/862, 588, 861, 770, 524/785, 780, 791

[56] References Cited

U.S. PATENT DOCUMENTS

| | | | |
|---|---|---|---|
| 3,723,497 | 3/1973 | Baney | 524/862 |
| 4,025,485 | 5/1977 | Kodama et al. | 524/862 |
| 4,081,397 | 3/1978 | Bowe | 252/194 |
| 4,698,386 | 10/1987 | Fujimoto et al. | 524/862 |
| 4,806,391 | 2/1989 | Shorin | 427/288 |

FOREIGN PATENT DOCUMENTS

| | | |
|---|---|---|
| 0110371 | 6/1984 | European Pat. Off. |
| 0231519 | 8/1987 | European Pat. Off. |
| 0358452 | 3/1990 | European Pat. Off. |
| 2235889 | 1/1974 | Germany |
| 54-053164 | 4/1979 | Japan ............... 524/862 |

*Primary Examiner*—Ralph H. Dean
*Attorney, Agent, or Firm*—William A. Teoli; William H. Pittman

[57] ABSTRACT

There is provided an infrared radiation curable organopolysiloxane composition having a poly(alkenylorganosiloxane), a siloxane hydride, an infrared radiation absorbent material, such as carbon black, and an effective amount of a platinum group metal catalyst. The infrared radiation curable organopolysiloxane composition can be used as a binder for a desiccant, such as a zeolite, useful in making multi-panel thermal pane windows.

7 Claims, No Drawings

INFRARED RADIATION CURABLE ORGANOPOLYSILOXANE COMPOSITIONS

CROSS REFERENCE TO RELATED APPLICATION

Reference is made to copending application Ser. No. 970,429, filed concurrently herewith, now U.S. Pat. No. 5,332,538.

BACKGROUND OF THE INVENTION

The present invention relates to a heat curable organopolysiloxane composition having a pot-life of at least 2 hours at ambient temperature, which can be rapidly cured using infrared radiation. More particularly, the present invention relates to heat curable platinum group metal catalyzed organopolysiloxane compositions containing an infrared radiation absorbing, or scattering, organic, inorganic or organometallic material.

Prior to the present invention, various platinum catalyzed heat curable organopolysiloxane compositions were available. Cure was effected by the addition of a silicon hydride to an alkenyl-substituted organosilicon material in accordance with a "hydrosilylation" mechanism. For example, Karstedt, in U.S. Pat. Nos. 3,714,334 and 3,775,452 assigned to the same assignee as the present invention, shows heat curable organopolysiloxane based on the use of a complex of Pt(O) and a vinylmethyl siloxane ligand as a hydrosilylation catalyst. Additional heat curable organopolysiloxane compositions employing platinum complexes, such as platinum halide complexes are shown by Ashby, U.S. Pat. No. 3,159,601 and Lamoreaux, U.S. Pat. No. 3,220,972, assigned to the same assignee as the present invention.

As shown by U.S. Pat. No. 3,445,420, the "pot life" or "working life" of heat curable organopolysiloxane compositions can be extended for at least 2 hours at 25° C., based on a platinum catalyzed hydrosilylation addition reaction using an inhibitor for the platinum catalyst. The purpose of the inhibitor is to slow down the addition reaction between $\equiv$SiH and $C_2H_3Si\equiv$ and thereby increase the work life of the organopolysiloxane mixture at low or room temperatures. Heat curable organopolysiloxane mixtures are generally composed of a base polymer consisting of a polydiorganosiloxane having chemically combined methylvinylsiloxy units which can be used in combination with a siliconhydride. Heat curable platinum catalyzed organopolysiloxane compositions employing an ethylenically unsaturated isocyanurate as an inhibitor are shown by Berger et al., U.S. Pat. No. 3,882,083 and U.S. Pat. Nos. 4,472,562 and 4,472,563 employing unsaturated acetylenic compounds as inhibitors.

In copending application Sr. No. 07/800,311, filed Nov. 29, 1991, which is incorporated herein by reference, there is shown heat curable organopolysiloxane compositions having a shelf stability exceeding 30 days at 25° C., and an oven cure of less than 60 minutes at 150° C. as a result of the employment of certain preformed latent platinum catalysts. The preformed latent platinum catalyst can be made by heating to a temperature of up to about 100° C., a mixture consisting essentially of a zero valent platinum complex and an organic nitrogen compound, such as an azodicarboxylate, a triazoline dione, an azodiketone, or a heterocyclic aromatic nitrogen compound.

As used hereinafter the expression "one part" means a heat curable organopolysiloxane composition which is platinum group metal catalyzed, exhibiting "a shelf stability" which is defined as being able to resist a substantial increase in viscosity after exposure to accelerated aging at 50° C. for several days and an oven cure of less than about 60 minutes at 150° C. Platinum group metal catalysts which can be used to make one part heat curable organopolysiloxane compositions include inhibited platinum group metal catalyst, preformed platinum group metal catalysts, such as shown in copending application 07/800,311, now abandoned, or encapsulated platinum group metal catalysts such as shown by Lewis et al., U.S. Pat. Nos. 5,015,691 and 5,106,939. "Two part" heat curable organopolysiloxane compositions are heat curable organopolysiloxane compositions which upon being initially formed, have a pot life of 2 hours to 3 days under ambient conditions.

Although various one part and two part heat curable platinum catalyzed organopolysiloxane compositions having pot lives exceeding 2 hours under ambient conditions have been developed, in certain situations, there is sometimes a need to be able to substantially accelerate the cure of such heat curable silicone materials within certain specific thickness ranges. Accordingly, heat curable silicone materials are needed having an accelerated "through cure rate" which is a cure rate which can be at least 3× and in some instances preferably 6× the rate of cure achieved by conventional heating methods. The term "through cure" more particularly means the cross-sectional cure of a one part or two part heat curable platinum group metal catalyzed organopolysiloxane composition having a thickness in the range of at least about 0.1 mm to about 10 cm.

SUMMARY OF THE INVENTION

The present invention is based on the discovery that through cures of platinum group metal catalyzed one part and two part heat curable organopolysiloxane compositions having pot lives of at least 2 hours at 25° C. can be effected by using infrared radiation sensitive absorbing materials, such as certain fillers or pigments. The heat curable platinum group metal catalyzed organopolysiloxane mixture can be through cured by exposure to infrared radiation, which hereinafter means electromagnetic radiation having a wavelength of 700 to 10,000 nm and an intensity of at least 0.5 to 100 watts/cm$^2$.

It has been found, for example, that if an infrared radiation absorbent material, such as at least 5 ppm of carbon black, or an effective amount of an infrared absorbing dye is used in the platinum group metal catalyzed heat curable organopolysiloxane composition, the rate of through cure of the heat curable mixture can be accelerated by up to 6× the rate which is normally obtained by conventional heating sources. In instances where the heat curable organopolysiloxane composition is in contact with a conductive surface, such as a metallic surface, for example, steel, as shown in copending application Ser. No. 970,429, filed Nov. 2, 1994, now U.S. Pat. No. 5,332,538, preheating of the metallic surface is preferred in order to minimize the degree of heat loss by conduction.

STATEMENT OF THE INVENTION

There is provided by the present invention, an infrared radiation curable organopolysiloxane composition comprising by weight, (A) 100 parts of a poly (alkenylorganosiloxane),
(B) 1 to 20 parts of a siloxane hydride,
(C) 0.0001 to 10.0 parts of an infrared radiation absorbent material, and
(D) an amount of a platinum group metal catalyst which is sufficient to effect a hydrosilylation reaction between (A) and (B).

Infrared radiation absorbent or scattering materials which can be utilized in the curable organopolysiloxane compositions of the present invention are for example, inorganic materials, such as carbon blacks and graphites, cerium oxide, titanium oxide, iron (III) oxide and ceramics, such as porcelain; infrared absorbing pigments, such as Prussian blue, organometallic compounds, such as (methylcyclopentadienyl) manganese tricarbonyl, (tetraphenylcyclobutadiene) (cyclopentadienyl) cobalt, organic compounds, such as anthracene, phenanthracene, anthraquinone and phenanthracenequinone. It has been found that depending upon the particular infrared radiation absorbent material used, the effective weight proportion of the absorbent material, per 100 parts by weight of the poly(alkenyl organosiloxane) can vary widely. For example, if a carbon black is chosen, such as a furnace black, a thermal carbon black, acetylene black, channel black or lamp black with an ASTM designator outlined in ASTM D1765-67, an effective amount is 0.0001 to 0.05 part and preferably 0.0001 to 0.01 part by weight based on the weight of the infrared radiation curable organopolysiloxane composition. Infrared absorbing or scattering pigments can be used in the range of 0.0005 to 4 parts by weight, and preferably 0.001 to 2.5 parts by weight based on the total composition weight.

The poly (alkenylorganosiloxane), or "vinylsiloxane" utilized in the one part heat curable organopolysiloxane compositions of the present invention can have a viscosity of from about 100 to 200,000 centipoise and a vinylsiloxy unit content of about 0.05 to about 3.5 mole %, and preferably 0.14 to about 2 mole % based on the total siloxy units having one or more organo radicals as defined hereinafter attached to silicon. The preferred vinyl siloxanes are included within the following formula,

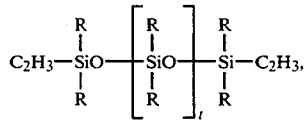
(1)

where $C_2H_3$ is vinyl, and R is selected from $C_{(1-13)}$ monovalent hydrocarbon radicals free of olefinic unsaturation, and t is a positive integer having a value sufficient to provide a vinyl siloxane viscosity of from about 10.0 to 200,000 centipoise at 25° C. Preferably, R is selected from alkyl radicals of 1 to 8 carbon atoms, such as methyl, ethyl, propyl; mononuclear aryl radicals such as phenyl, methylphenyl, ethylphenyl; cycloalkyl radicals, such as cycloheptyl and haloalkyl radicals such as 3,3,3-trifluoropropyl. Preferably, the vinyl siloxane has terminal units of the formula, $C_2H_3(CH_3)_2SiO_{0.5}$ The vinylsiloxane of formula (1) is generally prepared by equilibrating the appropriate cyclicsiloxane with the appropriate vinyl terminated low molecular weight polysiloxane chain-stopper. However, if vinyl organosiloxy units are desired in the backbone, a predetermined amount of cyclic vinyl organosiloxane can be used in the equilibration mixture. A preferred chain-stopper for the equilibration reaction is a low molecular weight vinyl terminated organopolysiloxane, such as the corresponding disiloxane, trisiloxane, tetrasiloxane. These low molecular weight vinyl terminated polysiloxane polymers are produced by hydrolyzing the appropriate chlorosilanes particularly vinyl diorganochlorosilanes along with diorganodichlorosilanes to produce the desired chain-stopper. The chain-stopper can be equilibrated with octamethylcyclotetrasiloxane in the presence of a catalyst to produce the desired vinyl siloxane having a viscosity varying from 10.0 to 200,000 centipoise at 25° C. The catalyst that is utilized is preferably a mild acid catalyst, such as toluenesulfonic acid or an acid treated clay such as Filtrol, which is a sulfuric acid activated clay manufactured and sold by Engelhard Corp. of Edison, N.J. When the equilibration has proceeded to about 85% completion, the acid catalyst can be neutralized with a base or simply filtered if acid activated clay is used to leave behind the linear polymer. Preferably, excess cyclics are stripped off so that the linear polymer will have a low volatile content and be relatively pure. There can also be utilized an alkali metal hydroxide as the catalyst such as for instance potassium or sodium hydroxide.

The silicon hydride siloxane, or silicon hydride siloxane fluid used in the invention can have about 0.04 to about 1.4 % by weight of chemically combined hydrogen attached to silicon. One form of the silicon hydride siloxane is a "coupler" having the formula,

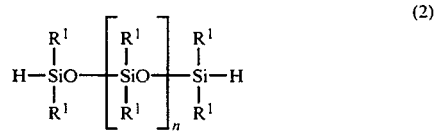
(2)

where $R^1$ is selected from $C_{(1-13)}$ monovalent hydrocarbon radicals free of olefinic unsaturation and n is an integer having a value sufficient to provide the "coupler" with a viscosity of 1 to 500 centipoise at 25° C. and from about 3 to 9 mole percent of chain-stopping diorganohydride siloxy units, based on the total moles of chemically combined siloxy units in the silicon hydride siloxane fluid.

In addition to the silicone hydride coupler of formula (2), the silicon hydride siloxane fluid used in the heat curable organopolysiloxane compositions of the present invention also can include silicon hydride resins consisting essentially of the following chemically combined units,

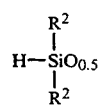

chemically combined with $SiO_2$ units, where the $R^2+H$ to Si ratio can vary from 1.0 to 2.7. Silicon hydride resin also can have units of the formula,

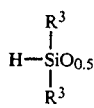

chemically combined with $SiO_2$ units and $(R^4)_2SiO$ units, where the $R^3+R^4+H$ to Si ratio can vary from 1.2 to 2.7, where $R^2$, $R^3$ and $R^4$ are $C_{(1-13)}$ monovalent hydrocarbon radicals free of olefinic unsaturation selected from $R^1$ radicals.

The silicon hydride siloxane fluid can be made by hydrolyzing the corresponding hydride chlorosilanes in the presence of an organic hydrocarbon solvent. For resins having only monofunctional units and tetrafunctional units, a hydrogen diorganochlorosilane can be hydrolyzed with a tetrachlorosilane. Resins having monofunctional siloxy units, difunctional siloxy units, and tetrafunctional siloxy units, can be obtained by hydrolyzing a hydrogen diorgano dichlorosilane, a tetrachlorosilane and a diorganodichlorosilane at particular ratios. Additional silicon hydride resins are shown by Jeram, U.S. Pat. No. 4,040,101 which is hereby incorporated by reference.

The silicon hydride siloxane fluid also can include linear hydrogen containing polysiloxane having the formula,

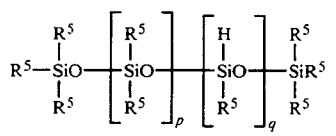 (3)

where $R^5$ is a $C_{(1-13)}$ monovalent hydrocarbon radical free of olefinic unsaturation, selected from $R^1$ radicals, and p and q are integers having values sufficient to provide a polymer having a viscosity of from 1 to 1,000 centipoise at 25° C.

The silicon hydride siloxane fluid of formula (3) can be produced by equilibrating the appropriate hydrogencyclopolysiloxane with the appropriate cyclopolysiloxane containing $R^5$ substituent groups, in combination with low molecular weight linear triorganosiloxy end-stopped chain-stoppers.

In formulas (2) and (3) and the chemically combined units described above, $R^1$, $R^2$, $R^3$, $R^4$ and $R^5$ can be the same or different radicals selected from the group consisting of alkyl radicals of 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifluoropropyl.

The silicon hydride coupler of formula (2) can be prepared by a hydrolysis process or an acid catalyzed equilibration process. In the equilibration process, the appropriate cyclotetrasiloxanes are equilibrated with a low molecular weight hydrogen terminated chain-stopper, such as a dihydrogen tetraorganodisiloxane. The acid catalyzed equilibration reaction is much the same as disclosed for the production of the vinyl containing base polymer. By the hydrolysis process, the appropriate hydrogen diorganochlorosilanes are hydrolyzed with the appropriate amount of diorganodichlorosilanes to produce the desired polymer of formula (2) above. When the silicon hydride coupler is produced, it can be separated from the undesirable amount of cyclics by stripping.

There also may be incorporated in the infrared radiation curable organopolysiloxane compositions of the present invention, from 5 to 200 parts by weight of an inert substantially non-infrared radiation absorbent reinforcing filler based on 100 parts by weight of vinyl siloxane. Some of the fillers which are included are, for example, fumed silica, precipitated silica and mixtures thereof. Preferably, less than 100 parts by weight of substantially inert filler, per 100 parts by weight of the poly(alkenyl organosiloxane) is utilized. In place of the reinforcing filler, such as fumed silica and precipitated silica, there also may be utilized extending fillers which are substantially transparent to infrared radiation and which do not unduly increase the viscosity of the composition in the uncured state. In addition, desiccants, such as molecular sieves and zeolites, or diatomaceous earth, such as Kieselguhr also can be used in major amounts by weight, based on the total weight of the composition.

Various complexes can be used as the platinum group metal catalyst for the thermally-activated addition reaction between the vinyl siloxane and the silicon hydride siloxane.

Some of the platinum group metal catalysts which can be employed to effect the hydrosilylation reaction are, for example, rhodium, ruthenium, palladium, osmium, iridium and platinum. Especially preferred are the well known platinum and rhodium catalysts, such as the platinum hydrocarbon complexes described in U.S. Pat. Nos. 3,159,601 and 3,159,662 to Ashby, the platinum alcoholate catalysts described in U.S. Pat. No. 3,220,972 to Lamoreaux, the platinum complexes of U.S. Pat. No. 3,814,730 to Karstedt, the platinum chloride-olefin complexes described in U.S. Pat. No. 3,516,946 to Modic and the rhodium complexes described in U.S. Pat. No. 4,262,107 to Eckberg, all of which are incorporated herein by reference.

An effective amount of the platinum catalyst is an amount of platinum catalyst sufficient to provide from 5 ppm to 200 ppm of platinum based on the weight of the infrared radiation curable silicone composition and preferably from 10 to 100 ppm.

In addition to platinum group metal catalysts, catalyst inhibitors can be used at 0.01 to 3.0 parts of the infrared radiation curable silicone composition to extend the pot life of the infrared curable silicone composition in particular situations. Some of the inhibitors which can be used are acetylenic alcohols as shown in U.S. Pat. No. 4,603,168 to Susaki, acetylenic dicarboxylates in U.S. Pat. No. 4,943,601 to Dinallo, acetylenic alpha ketones in U.S. Pat. No. 4,595,739 to Cavazzan, alkynylsilanes in U.S. Pat. No. 4,472,562 to Shirahata, ene-ynes in U.S. Pat. No. 4,465,818 to Shirahata, maleates in U.S. Pat. No. 4,783,552 to Lo, fumarates in U.S. Pat. No. 4,774,111 to Lo, maleimides and monomaleates in U.S. Pat. No. 4,530,989 to Michel, vinyl acetate in U.S. Pat. No. 4,476,166 to Eckberg, carboxylic esters in U.S. Pat. No. 4,340,647 to Eckberg, Dialkyl azodicarboxylates in U.S. Pat. No. 4,670,531 to Eckberg, isocyanurates in U.S. Pat. No. 3,882,083 to Berger, 1,4-dicarboxylic acids in U.S. Pat. No. 4,448,815 to Grenoble, azo compounds in U.S. Pat. No. 3,862,081 to Ito and U.S. Pat. No. 5,122,585 to Sumpter. Additional inhibitors are allenes as described in EP 145,526 to Cavezzan, cyclic vinyl siloxanes in EP 252,858 to Cavezzan, trienes in U.S. Pat. No. 4,741,966 to Cavezzan, alkenecyclohexenes in U.S. Pat. No. 4,699,813 to Cavezzan, amines in U.S. Pat. No. 4,584,361 to Janik, hydrazones in U.S. Pat. No. 4,710,559 to Essinger, amides in U.S. Pat. No. 4,337,332 to Melanchon, vinyl silicones in U.S. Pat. No. 4,785,066 to Maxson, isothiocyanates in EP 384,325 to Irifure and triazoline diones as described in copending application Ser. No. 07/800,310, filed Nov. 29, 1991, now U.S. Pat. No. 5,206,329, to Sumpter et al, all of which are incorporated herein by reference.

Latent platinum group metal catalysts are also effective for the thermally-activated addition reaction between the vinyl siloxane and the silicon hydride siloxane. The latent catalysts allow the preparation of one-part formulation containing the vinyl siloxane, an effective amount of the latent platinum group metal catalyst and the silicone hydride siloxane, while still allowing a flowable mixture stable for at least 5 days at 50° C. Some of the latent catalysts which can be employed to effect the hydrosilylation reaction at elevated temperatures of at least 100° C. are, for example, the product of the reaction of a zero valent platinum complex as described by Karstedt in U.S. Pat. No. 3,775,452 with dialkyl azodicarboxylates, azo compounds, triazoline diones and aromatic nitrogen heterocycles as described in copending application Ser. No. 07/800,311, now abandoned, and incorporated herein by reference and inclusion compounds of a cyclodextrin and a complex of a 1,5-cyclooctadiene and a platinum group metal material such as a platinum halide as shown in U.S. Pat. No. 5,025,073 to Lewis and U.S. Pat Nos. 5,106,939, 5,132,385 and 5,132,442 to Sumpter et al, all of which are incorporated herein by reference.

In order that those skilled in the art will be better able to practice the present invention, the following examples are given by way of illustration and not by way of limitation. All parts are by weight.

EXAMPLE 1

In the preparation of a vinyl silicone base formulation for use in an addition curable silicone compositions curable by infrared radiation, there was combined 95 parts of a vinyl stopped polydimethylsiloxane fluid having an average viscosity of 4000 centipoise and 5 parts of hexamethyldisilazane treated fumed silica. The mixture was blended in a Ross Dual Planetary mixer to give a homogeneous base formulation having a 4800 centipoise viscosity.

An addition curable composition was prepared by combining 96 parts of the base formulation with 25 ppm (0.0025 parts) of an acetylene carbon black (ASTM designator N582) having a surface area of 80 m²/g. The resulting formulation was mixed in a high speed mixer until uniform. There was then added to the mixture, a zero valent platinum complex (5.65% Pt) in a xylene solvent as shown by Karstedt, U.S. Pat. No. 3,755,452 to provide 30 ppm of Pt. There was then added 0.2 parts of diallylmaleate to the formulation as an inhibitor and the mixture was then thoroughly hand mixed. Four parts of a silicone hydride siloxane fluid was added having chemically combined hydride siloxy units and a viscosity of 150 centipoise (0.8% H). The resulting mixture was thoroughly hand mixed and degassed under vacuum.

A 2.54 cm square Teflon resin mold having a 1 cm deep cavity was filled with the above curable mixture. The mold had a black infrared absorbing base and the mold was fitted with four gold coated thermocouples which were vertically spaced 2 mm apart to monitor the temperature of the curable mixture over various thicknesses during cure.

The curable mixture was irradiated from above for 75 seconds by a 7.5 watt/cm² Heraeus short wave length tungsten infrared light source. During exposure, a Fluke multi-channel analyzer using Hydra Datalogger software recorded the temperatures from the four thermocouples. A maximum temperature was found to be 236° C. at a 2 mm depth and 128° C. at a 8 mm depth. The sample was allowed to cool under ambient conditions. The cured sample was found to have a Shore A durometer of 17. A similar sample was oven cured at 150° C. for 30 minutes and was found to have a Shore A durometer of 15.

EXAMPLE 2

The procedure of Example 1 was repeated except the platinum catalyst and inhibitor was replaced with a preformed platinum catalyst as described in copending application Ser. No. 07/800,311, filed Nov. 29, 1991, abandoned, and incorporated herein by reference. This latent catalyst was prepared by adding 58.4 $\mu$L, ($1.54 \times 10^{-5}$ mols Pt) of a platinum catalyst shown by Karstedt, U.S. Pat. No. 3,775, 452, to a 1 mL methylene chloride solution of 2,2'-bipyridine ($3.98 \times 10^{-4}$ mols). The mixture was then stirred for four hours at ambient temperature. The preformed catalyst was added to the formulation to provide 30 ppm Pt. The curable mixture was irradiated as described in Example 1 for 73 seconds. The maximum temperatures of the mixture after exposure was 230° C. at about a 2 mm depth and 122° C. at about an 8 mm depth. The sample was allowed to cool under ambient conditions. The cured sample was found to have a Shore A durometer of 16.

EXAMPLE 3

The procedure of Example 2 was repeated except that 200 ppm (0.020 parts) of Prussian blue was substituted for carbon black. After 75 seconds exposure, a temperature of 235° C. at 2 mm depth was recorded and 142° C. at 8 mm depth of the sample was recorded. The sample was allowed to cool as in Example 1. The cured sample was found to have a Shore A durometer of 15.

EXAMPLE 4

The procedure of Example 2 was repeated except that 2000 ppm (0.20 parts) of anthraquinone was used as the infrared absorbing material. The sample was irradiated as described in Example 1 for 110 seconds. The exposed mixture exhibited a temperature of 203° C. at a 2 mm depth and 156° C. at an 8 mm depth. The sample was allowed to cool as in Example 1. The cured sample was found to have a Shore A durometer of 10.

EXAMPLE 5

An infrared radiation curable silicone composition was prepared by combining in a Ross Dual Planetary mixer, 37.5 parts of a vinyl terminated dimethylsiloxane fluid having a 400 centipoise viscosity, 62.5 parts of 3A molecular sieves or zeolites as a desiccant and 20 ppm (0.002 parts) of the acetylene carbon black described in Example 1. A smooth gray flowable mixture was obtained.

To 96 parts of the above base was added 30 ppm Pt, as the preformed catalyst described in Example 2. The blend was mixed for 2 minutes in a high speed mixer. To this formulation there was added 4 parts of the siloxane hydride of Example 1. Cure of the mixture resulted after irradiation for 75 seconds as described in Example 1. The maximum temperatures measured after total exposure time was 213° C. at a 2mm depth and 124° C. at an 8 mm depth.

Although the above examples are directed to only a few of the very many variables which can be used in the practice of the present invention it should be understood that the present invention is directed to a much broader variety of infrared curable silicone compositions containing other infrared sensitive materials or platinum catalysts which are set forth in the description preceding these examples.

What is claimed is:

1. A smooth flowable infrared radiation curable organopolysiloxane composition having a pot-life of at least two hours comprising by weight,
   A) 100 parts of a poly(alkenylorganosiloxane),
   B) 1 to 20 parts of a siloxane hydride,
   (C) 0.001 to 10.0 parts of an infrared radiation absorbent material,
   (D) an amount of a platinum group metal catalyst in combination with a platinum group metal catalyst inhibitor, or a latent platinum group metal catalyst which is sufficient to effect a hydrosilylation reaction between (A) and (B), and
   (E) at least a major amount of a zeolite.

2. An infrared radiation curable organopolysiloxane composition in accordance with claim 1, where the infrared radiation absorbing material is 0.0001 to 0.01 part of carbon black.

3. An infrared radiation curable organopolysiloxane composition in accordance with claim 1 where the polyalkenylorganosiloxane is a polyvinylmethylsiloxane.

4. An infrared radiation curable organopolysiloxane composition in accordance with claim 1, where the siloxane hydride is a methyl hydrogen polysiloxane.

5. A smooth flowable infrared radiation curable organopolysiloxane composition in accordance with claim 1, having an effective amount an infrared radiation absorbent organic material selected from the class consisting of anthracene, phenanthracene, anthraquinone and phenanthracenequinone.

6. A smooth flowable infrared radiation curable organopolysiloxane composition in accordance with claim 1 having an effective amount of an infrared radiation absorbent organometallic material selected from the class consisting of Prussian blue, (methylcyclopentadienyl) manganese tricarbonyl and (tetraphenylcyclobutadiene) (cyclopentadienyl) cobalt.

7. A method for effecting the cure of an infrared radiation curable organopolysiloxane composition of claim 1 which comprises applying onto a substrate to a thickness of up to about 10 cm and exposing the applied organopolysiloxane composition to infrared radiation having a wave length of 700 to 10,000 nm and an intensity of at least 0.5 to 100 watts/cm$^2$.

* * * * *